United States Patent
Kerselaers et al.

(10) Patent No.: US 10,862,542 B1
(45) Date of Patent: Dec. 8, 2020

(54) NEAR-FIELD CONVERTER

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/567,165

(22) Filed: Sep. 11, 2019

(51) Int. Cl.
*H04B 5/00* (2006.01)

(52) U.S. Cl.
CPC ......... *H04B 5/0081* (2013.01); *H04B 5/0031* (2013.01)

(58) Field of Classification Search
CPC .......................... H04B 5/00–06; G08B 13/14
See application file for complete search history.

(56) References Cited

U.S. PATENT DOCUMENTS

| | | | | |
|---|---|---|---|---|
| 6,122,492 A * | 9/2000 | Sears | .................... | G06K 7/0008 330/124 R |
| 6,714,133 B2 * | 3/2004 | Hum | .................... | G06K 7/0008 340/572.1 |
| 7,171,177 B2 * | 1/2007 | Park | .................... | H04B 13/005 340/573.1 |
| 7,429,953 B2 | 9/2008 | Buris | | |
| 9,520,921 B2 * | 12/2016 | Pagani | .................... | H01Q 7/00 |
| 9,819,097 B2 * | 11/2017 | Kerselaers | ............. | H01Q 1/273 |
| 9,882,625 B2 | 1/2018 | Gluck | | |
| 10,320,086 B2 * | 6/2019 | Kerselaers | ............... | H01Q 7/08 |
| 2004/0219890 A1 * | 11/2004 | Williams | ............. | H04B 13/005 455/100 |
| 2009/0117847 A1 * | 5/2009 | Roesner | ............. | G06K 7/10178 455/7 |
| 2009/0146796 A1 * | 6/2009 | Goto | ........................ | H04B 5/02 340/10.51 |
| 2009/0267771 A1 * | 10/2009 | Roesner | ............. | G06K 7/10316 340/572.7 |
| 2012/0032522 A1 * | 2/2012 | Schatz | ................... | H02J 7/0042 307/104 |
| 2013/0078910 A1 * | 3/2013 | Akiyama | ......... | G06K 19/07749 455/11.1 |
| 2014/0015649 A1 * | 1/2014 | Akiyama | ............. | G06K 7/0008 340/10.51 |
| 2015/0093988 A1 * | 4/2015 | Konanur | ............. | H04L 63/0884 455/41.1 |
| 2015/0126113 A1 * | 5/2015 | Cech | .................... | H04B 5/0031 455/41.1 |

FOREIGN PATENT DOCUMENTS

CA 2419116 A1 2/2003

OTHER PUBLICATIONS

Electrostatic Coupling—an overview | ScienceDirect Topics, retrived from https://www.sciencedirect.com/topics/engineering/electrostatic-coupling (Year: 2020).*

* cited by examiner

*Primary Examiner* — Gennadiy Tsvey

(57) ABSTRACT

One example discloses a near-field converter, including: a near-field magnetic antenna responsive to near-field magnetic signals; a near-field electric antenna responsive to near-field electric signals; wherein the converter is configured to, convert received near-field magnetic signals into and transmit as near-field electric signals; or convert received near-field electric signals into and transmit as near-field magnetic signals.

15 Claims, 3 Drawing Sheets

NEAR-FIELD CONVERTER

The present specification relates to systems, methods, apparatuses, devices, articles of manufacture and instructions for near-field conversion.

SUMMARY

According to an example embodiment, a near-field converter, comprising: a near-field magnetic antenna responsive to near-field magnetic signals; and a near-field electric antenna responsive to near-field electric signals; wherein the converter is configured to, convert received near-field magnetic signals into and transmit as near-field electric signals; or convert received near-field electric signals into and transmit as near-field magnetic signals.

In another example embodiment, the near-field magnetic antenna includes a set of feed-points; the near-field electric antenna includes a set of conductive surfaces; and the feed-points of the near-field magnetic antenna are galvanically connected to the conductive surfaces of the near-field electric antenna.

In another example embodiment, the converter is configured to receive a first set of near-field signals from a first device; the converter is configured to convert the first set of near-field signals into a second set of near-field signals; and the converter is configured to transmit the second set of near-field signals to a second device.

In another example embodiment, the first set of near-field signals are magnetic near-field signals and the second set of near-field signals are electric near-field signals.

In another example embodiment, the first set of near-field signals are electric near-field signals and the second set of near-field signals are magnetic near-field signals.

In another example embodiment, the first device includes a near-field circuit that communicates using only near-field magnetic induction; and the second device includes a near-field circuit that communicates using near-field magnetic and/or electric induction.

In another example embodiment, the near-field converter is configured to communicate with the first device through an ambient air medium, and the near-field converter is configured to communicate with the second device through a capacitively connected conductive host structure.

In another example embodiment, the near-field converter is included in an array of near-field converters distributed throughout a substrate, a fabric, or a grid.

In another example embodiment, the fabric is an item of clothing.

In another example embodiment, the converter includes only passively powered components.

In another example embodiment, the converter includes only capacitive, inductive and/or resistive components.

In another example embodiment, the converter does not include a battery and is not coupled to a mains power source.

In another example embodiment, the converter is powered only by either the near-field magnetic signals or near-field electric signals.

In another example embodiment, the converter includes a frequency conversion circuit; and the frequency conversion circuit is configured to receive the near-field signals at a first carrier frequency and transmit the near-field signals at a second carrier frequency.

In another example embodiment, the converter includes a filter circuit; and the filter circuit is configured to reduce interference between multiple sets of received and transmitted near-field signals.

In another example embodiment, further comprising a tuning circuit coupled to both antennas.

In another example embodiment, the magnetic antenna is configured to receive or transmit non-propagating quasi-static magnetic near-field signals; and the electric antenna is configured to receive or transmit non-propagating quasi-static electric near-field signals.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 2:
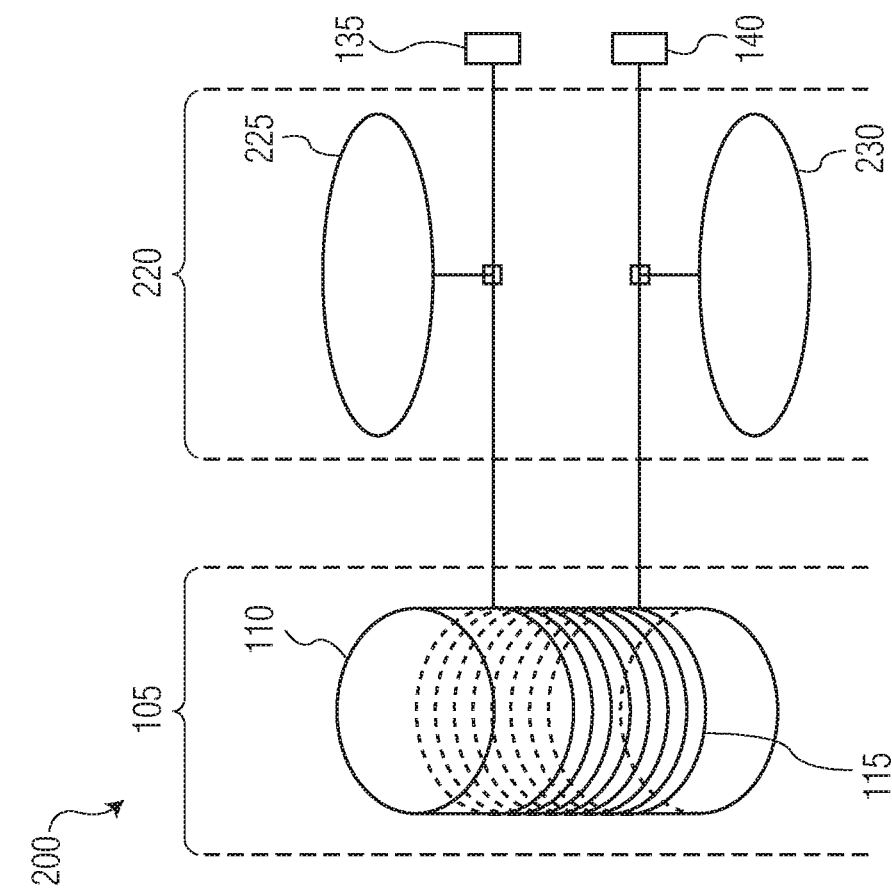
FIG. 2 is an example of a second near-field antenna in a second near-field wireless device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between a near-field device, perhaps on a user's body, and other conductive surfaces and/or other wireless networked devices (e.g. Internet of Things (IoT) devices) based on near-field electromagnetic induction (NFEMI), where the transmitter and receiver are coupled by both magnetic (H) and electric (E) fields. While RF wireless communication is accomplished by propagating an RF plane wave through free space, NFEMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some wearables, such as hearing aids and wireless earbuds, employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished. Unfortunately, H-field based NFMI systems with small antenna coils have a limited range that may be much smaller than an entire wearable user's body. Such H-field communications are sensitive to coil orientation. In the case of a hearing aid form factor, a H-field induction based system cannot cover an entire human body. However, since in hearing aids both coils are always aligned with each other, they are not influenced by the movement of the human body.

Other wearables employ Near-field Electric Induction (NFEI)) as a wireless communication method. NFEI allows electronic devices on and near a conductive surface (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

Figure 1:
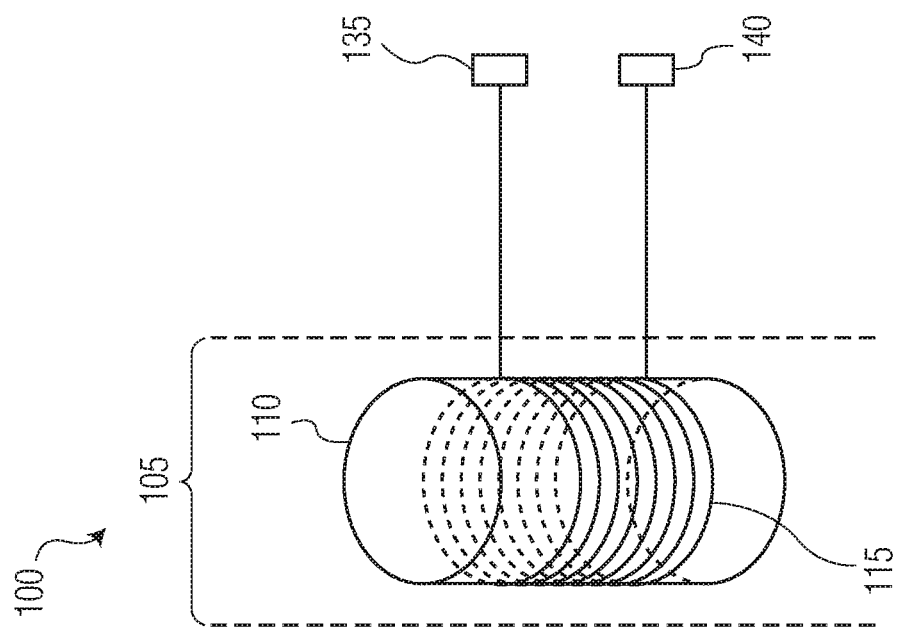
FIG. 1 is an example of a first near-field antenna in a first near-field wireless device.

FIG. 1 is an example of a first near-field antenna 100 in a first near-field wireless device. In this example the antenna 100 is a near-field magnetic induction (NFMI) antenna. The antenna 100 includes a coil (H-field) antenna 105 for magnetic fields. The H-field antenna 105 includes a ferrite core 110 wound with wire 115. Antenna 100 feed points 135, 140 are coupled to various transceiver circuitry, such as a downstream radio transmitter and receiver integrated circuit (RF-IC), (not shown here). The antenna 100 can be tuned to resonate at a communication frequency by means of reactance elements/components (e.g. capacitors (C-bank)) that are integrated in the RF-IC. The antenna's 100 bandwidth and quality-factor (Q) can similarly be tuned using the reactance elements/components (e.g. resistors (R-bank)).

FIG. 2 is an example of a second near-field antenna 200 in a second near-field wireless device. In this example the antenna 200 is a near-field electromagnetic induction (NFEMI) antenna. The antenna 200 includes the coil (H-field) antenna 105 for magnetic fields, in conjunction with a short loaded dipole (E-field) antenna 220 for electric fields. The H-field antenna 105 includes a ferrite core 110 wound with wire 115. The E-field antenna 220 includes two conductive loading surfaces 225 and 230. Antenna 200 feed points 135, 140 also can be coupled to various transceiver circuitry, such as a downstream radio transmitter and receiver integrated circuit (RF-IC), (not shown here). The antenna 200 can also be tuned to resonate at a communication frequency by means of reactance elements/components (e.g. capacitors (C-bank)) that are integrated in the RF-IC. The antenna's 200 bandwidth and quality-factor (Q) can similarly be tuned using the reactance elements/components (e.g. resistors (R-bank)).

When the NFEMI antenna 200 is proximate to a conductive structure (e.g. a structure having one or more conductive surfaces, a body, a person, an object, etc.) the magnetic and electric fields will be substantially confined to the conductive surface and not significantly radiate in free-space. This enhances security and privacy of such body networked communications.

In various example embodiments, the antenna 200 operates at or below 50 MHz (e.g. for example at 30 MHz) to ensure that the fields are following the conductive surface's contours and to ensure that far field radiation is strongly reduced.

Devices communicating with near-fields can be used when a limited communication range is required for security and/or non-interference purposes since they do not radiate much far field energy. Such near-field devices also can use small more compact antennas compared to their communication wavelength.

However, in some applications the near-field device's limited range can be a liability and/or the near-field signals can be blocked. For example, magnetic near-field devices have limited range and can be blocked by various structures such as vehicles, walls and containers. As one illustration, some near-field sensing devices positioned on a vehicle cannot always be in reached by a handheld near-field magnetic reading device (e.g. a smart phone with NFC), since the vehicle's structures poses a barrier to magnetic induction communication.

Now discussed is a near-field converter for communicating information from a first wireless device to a second wireless device, wherein the near-field converter is configured to receive a first type of near-field signal (i.e. magnetic and/or electric) from a first device, convert the first type of near-field signal (e.g. magnetic or electric) into a second different type of near-field signal (e.g. magnetic to electric, and/or electric to magnetic), and then transmit the second type of near-field signal to a second device.

Figure 3:
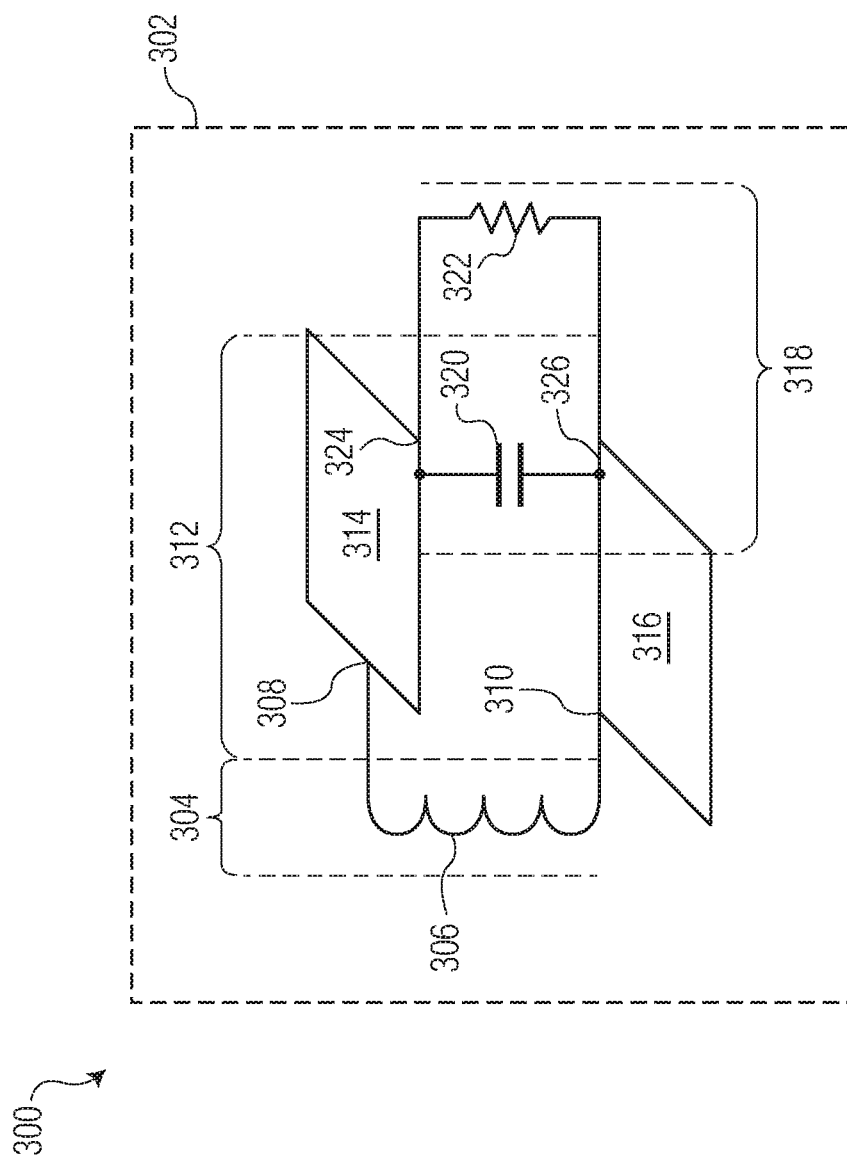
FIG. 3 is an example idealized electrical equivalent of a near-field converter.

FIG. 3 is an example 300 idealized electrical equivalent of a near-field converter 302. The near-field converter 302 includes a near-field magnetic antenna (H-field) 304 (having a coil 306 and feed-points 308, 310), a near-field electric antenna (E-field, short dipole) 312 (having conductive surfaces 314, 316), and a tuning circuit 318 (having capacitive element(s) 320 and resistive element(s) 322). Points 324, 326 are also shown.

The near-field magnetic antenna (H-field) 304 is responsive to near-field magnetic signals and the near-field electric antenna (E-field, short dipole) 312 is responsive to near-field electric signals. Responsive is herein defined to include any form of near-field communication (i.e. receiving and/or transmitting).

When the near-field converter 302 receives near-field magnetic signals, the received magnetic field induces a voltage $V_i$ in the coil 306.

$$V_i = 2\pi NFS\mu_o\mu_r H$$

where:

N number of turns in the coil 306
F communication frequency in Hz
S surface area of the coil in m$^2$ $\mu_o$ permeability of free-space vacuum ($4\pi \times 10^{-7}$ H/m)
$\mu_r$ relative permeability (e.g. of air)
H magnetic field strength in A/m The induced voltage $V_i$ is multiplied by a quality factor of the converter's 302 near-field antennas 304, 312 as tuned to a desired communication frequency (F) with the capacitive element(s) 320 and to a desired bandwidth with the resistive element(s) 322 within the tuning circuit 318.

The voltage ($V_L$) across the feed-points 308, 310 of the coil 306 is $V_L = Q V_i$, where Q is the quality factor and $V_i$ is the induced voltage (in volts) by the magnetic field.

The coil 306 in different example embodiments can be a ferrite core with helical windings, or alternatively have a planar surface with flat spiral windings.

The two conductive surfaces 314, 316 in some example embodiments are galvanically connected to the coil 306 such that the voltage on the coil 306 is the same as the voltage across the conductive surfaces 314, 316.

Other frequency translation and/or filtering circuits (not shown) can be added to enable the near-field converter 302 to relay communications between multiple sets of near-field devices. For example, the converter 302 can include a frequency conversion circuit (not shown) configured to receive the near-field signals at a first carrier frequency and transmit the near-field signals at a second carrier frequency.

The converter 302 in various example embodiments can also include a filter circuit (not shown) configured to reduce interference between multiple sets of received and transmitted near-field signals.

In some example embodiments, the converter 302 includes only passively powered components. Passively powered components are herein defined as not connected to either a battery and/or a mains power supply.

Passively powered components do include capacitors for charge storage and inductors, or other elements such as solar cells, for energy harvesting (e.g. from the near-field signals). In some example embodiments, the converter 302 includes only antenna structures 304, 312, capacitive element(s) 320 and/or resistive element(s) 322.

Benefits of such a passively powered converter 302 include various IoT (Internet of Things) applications where not having to replace a battery is desirable.

Figure 4:
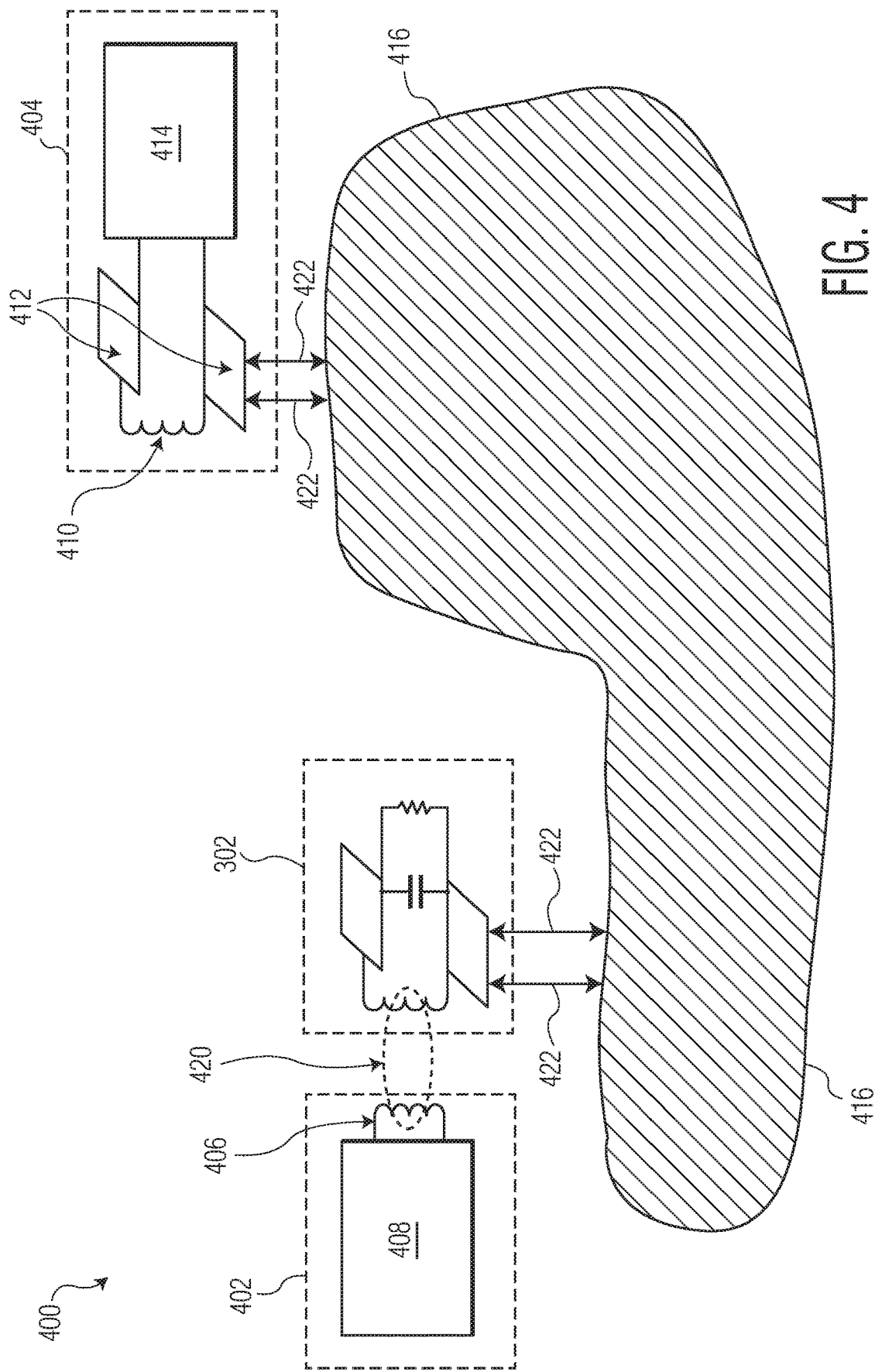
FIG. 4 is an example idealized electrical equivalent of the near-field converter relaying near-field signals between a first near-field device and a second near-field device.

FIG. 4 is an example 400 idealized electrical equivalent of the near-field converter 302 relaying near-field signals between a first near-field device 402 and a second near-field device 404. The first near-field device 402 includes a near-field magnetic antenna (H-field) 406 and a transceiver circuit 408 (including an internal frequency and bandwidth tuning circuit). The second near-field device 404 includes a near-field magnetic antenna (H-field) 410, a near-field electric antenna (E-field) 412, and a transceiver circuit 414 (also including an internal frequency and bandwidth tuning circuit).

In this example 400, communication between the first device 402 and the near-field converter 302 is through an ambient air medium, and communication between the near-field converter 302 and the second device 404 is via a conductive host structure 416.

Near-field magnetic signals 420 are coupled between the near-field magnetic antenna (H-field) 406 of the first device 402 and the near-field magnetic antenna (H-field) 304 of the near-field converter 302.

The near-field converter 302 converts near-field magnetic signals 420 into near-field electric signals 422.

The near-field electric signals 422 are coupled between the near-field electric antenna (E-field) 312 of the near-field converter 302 and the conductive host structure 416 when the converter 302 is positioned sufficiently close to the conductive host structure 416.

The near-field electric signals 422 are distributed across the conductive host structure 416.

The near-field electric signals 422 are coupled between the near-field electric antenna (E-field) 412 of the second near-field device 404 and the conductive host structure 416 when the second near-field device 404 is positioned sufficiently close to the conductive host structure 416.

In some example embodiments, the near-field electric coupling through the conductive host structure 416 is only used when a distance between the first device 402 and the second device 404 is too large for their respective near-field magnetic antennas 406, 410 to directly communicate.

The near-field converter 302 in some examples thus extends a communications range of the first device 402 so that it can communicate with the second device 404 and vice versa.

In some example embodiments, the near-field converter 302 can itself be part of an otherwise battery and/or mains powered device that is placed in standby mode, or whose baseband transmit/receive circuits have been temporarily isolated from the converter's 302 near-field antennas 304, 312.

In various other example embodiments, the second near-field device 404 is either an NFEI device that does not include the coil 306 or is an NFEI device where the coil 306 is partially or wholly shielded inside a package, container or behind a conductive structure (e.g. a robust flat conductive security plate that both enables and protects a near-field authentication device in a smart-lock).

The near-field converter 302 in other applications can be included in: a tag, a wearable patch, arrayed in a smart-fabric, as part of a wireless body network, in an identification system, on or nearby industrial equipment, as part of a measurement or control system, and/or for enabling inter or intra vehicle communications (e.g. V2X, transit, bicycles, cars, etc.).

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field converter, comprising:
a near-field magnetic antenna responsive to near-field magnetic signals; and
a near-field electric antenna responsive to near-field electric signals;
wherein the converter is configured to,
convert received near-field magnetic signals into and transmit as near-field electric signals; and
convert received near-field electric signals into and transmit as near-field magnetic signals;
wherein the converter is configured to receive a first set of near-field signals from a first device, to convert the first set of near-field signals into a second set of near-field signals; and to transmit the second set of near-field signals to a second device; and
wherein the near-field converter is configured to communicate with the first device using near-field magnetic induction through an ambient air medium, and the near-field converter is configured to communicate with the second device using near-field electric induction through a capacitively connected conductive host structure;
wherein the near-field converter is included in an array of near-field converters distributed throughout a fabric;
wherein the fabric is an item of clothing.

2. The converter of claim 1:
wherein the near-field magnetic antenna includes a set of feed-points;
wherein the near-field electric antenna includes a set of conductive surfaces; and
wherein the feed-points of the near-field magnetic antenna are galvanically connected to the conductive surfaces of the near-field electric antenna.

3. The converter of claim 1:
wherein the first set of near-field signals are magnetic near-field signals and the second set of near-field signals are electric near-field signals.

4. The converter of claim 1:
wherein the first set of near-field signals are electric near-field signals and the second set of near-field signals are magnetic near-field signals.

5. The converter of claim 1:
wherein the first device includes a near-field circuit that communicates using only near-field magnetic induction; and
wherein the second device includes a near-field circuit that communicates using near-field magnetic and/or electric induction.

6. The converter of claim 1:
wherein the converter includes only passively powered components.

7. The converter of claim 1:
wherein the converter includes only capacitive, inductive and/or resistive components.

8. The converter of claim 1:
wherein the converter does not include a battery and is not coupled to a mains power source.

9. The converter of claim 1:
wherein the converter is powered only by either the near-field magnetic signals or near-field electric signals.

10. The converter of claim 1:
wherein the converter includes a frequency conversion circuit; and
wherein the frequency conversion circuit is configured to receive the near-field magnetic or electric signals at a first carrier frequency and transmit the near-field magnetic or electric signals at a second carrier frequency.

11. The converter of claim 1:
wherein the converter includes a filter circuit; and
wherein the filter circuit is configured to reduce interference between multiple sets of received and transmitted near-field signals.

12. The converter of claim 1:
further comprising a tuning circuit coupled to both antennas.

13. The converter of claim 1:
wherein the near-field magnetic antenna is configured to receive or transmit non-propagating quasi-static magnetic near-field signals; and wherein the near-field electric antenna is configured to receive or transmit non-propagating quasi-static electric near-field signals.

14. A near-field converter, comprising:
a near-field magnetic antenna responsive to near-field magnetic signals; and
a near-field electric antenna responsive to near-field electric signals;
wherein the converter is configured to,
  convert received near-field magnetic signals into and transmit as near-field electric signals; and
  convert received near-field electric signals into and transmit as near-field magnetic signals;
wherein the converter includes a frequency conversion circuit;
wherein the converter and frequency conversion circuit are configured to receive a first set of near-field signals at a first carrier frequency from a first device, to convert the first set of near-field signals into a second set of near-field signals at a second carrier frequency; and to transmit the second set of near-field signals to a second device; and
wherein the near-field converter is configured to communicate with the first device using near-field magnetic induction through an ambient air medium, and the near-field converter is configured to communicate with the second device using near-field electric induction through a capacitively connected conductive host structure;
wherein the near-field converter is included in an array of near-field converters distributed throughout a fabric;
wherein the fabric is an item of clothing.

15. A near-field converter, comprising:
a near-field magnetic antenna responsive to near-field magnetic signals; and
a near-field electric antenna responsive to near-field electric signals;
wherein the converter is configured to,
  convert received near-field magnetic signals into and transmit as near-field electric signals; and
  convert received near-field electric signals into and transmit as near-field magnetic signals;
wherein the converter includes a filter circuit;
wherein the converter and filter circuit are configured to receive a first set of near-field signals from a first device, to convert and filter the first set of near-field signals into a second set of near-field signals; and to transmit the second set of near-field signals to a second device; and
wherein the near-field converter is configured to communicate with the first device using near-field magnetic induction through an ambient air medium, and the near-field converter is configured to communicate with the second device using near-field electric induction through a capacitively connected conductive host structure;
wherein the near-field converter is included in an array of near-field converters distributed throughout a fabric;
wherein the fabric is an item of clothing.

* * * * *